April 15, 1924.

F. A. TEFFT

TERMINAL BOX

Filed July 5, 1921

1,490,298

INVENTOR.
Frederick A. Tefft
by
Owen, Owen & Crampton

Patented Apr. 15, 1924.

1,490,298

UNITED STATES PATENT OFFICE.

FREDERICK A. TEFFT, OF TOLEDO, OHIO.

TERMINAL BOX.

Application filed July 5, 1921. Serial No. 482,359.

*To all whom it may concern:*

Be it known that I, FREDERICK A. TEFFT, a citizen of the United States, and a resident of Toledo, in the county of Lucas and State of Ohio, have made an invention appertaining to Terminal Boxes; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to produce a convertible terminal box that may be readily converted from one that may be used for mechanically connecting a chandelier or lamp bracket with the box, the box being provided with knock-out portions for receiving the wires and their insulating sleeves or looms. The box is provided with a threaded portion for connecting the box to the chandelier or lamp bracket that may be knocked out when the box is to be used for other terminal purposes either in connection with the chandelier or otherwise.

Structures containing the invention may be modified in their details without departing from the spirit of the invention as described and set forth hereinafter. To show the practicability of the invention I have selected a structure containing the invention and shall describe it hereinafter. The structure selected is illustrated in the accompanying drawings.

Figure 1:
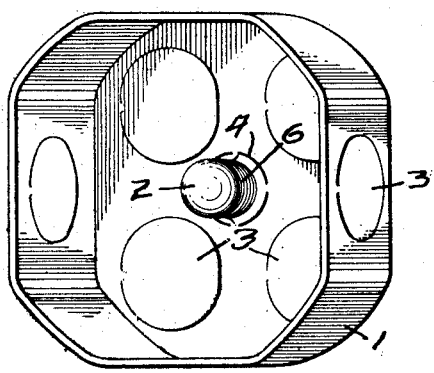
Figure 2:
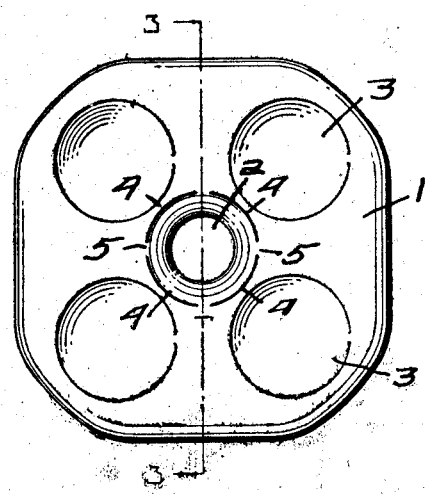
Figure 3:
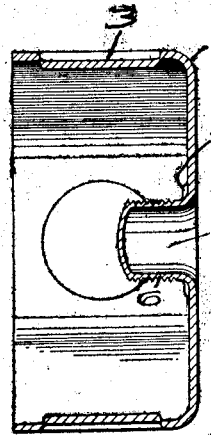

Figure 1 of the drawings is a perspective view looking into the box. Fig. 2 is a rear view, and Fig. 3 is a sectional view taken on the line 3—3 indicated in Fig. 2.

The box 1 is preferably formed of a single sheet metal piece that is die-pressed to box form. It is provided with a die-pressed inwardly extending central portion forming the teat or knob 2. The box may be formed in any shape, such as circular or substantially octagonal, the latter form being shown in the drawing.

The box is provided with the usual knock-out portions 3 which is formed by making circular cuts so as to displace disc-shaped portions relative to surfaces of the box by leaving these portions intact with the box except for the cuts that are made partially through the thickness of the box, in the manner well known in the art. The knob or teat 2 is also provided with surrounding circular cuts 4 which, however, leave portions 5 between the ends of the cuts 4. These are preferably located at four points around the teat or knob 2 that sufficiently strengthen the connection between the teat or knob 2 with the body of the box and so that when the bracket or chandelier is connected with the box it will have sufficient strength to withstand any strains that the two may be subjected to in so far as their interconnection is concerned. When the teat is not to be used for connection with a chandelier or lamp bracket it may be removed by punching out with a simple hand tool and thus disconnect it from the box. The box may then be clamped in position by a chandelier or lamp bracket or may be used for terminal connections in other ways.

The teat or knob 2 is threaded as at 6 whereby the chandelier or lamp bracket may be screwed onto the teat and thus mechanical connection established between the chandelier and the lamp bracket.

I claim:

In a terminal box formed of a single piece of sheet metal and having knock-out portions for receiving electrical terminals, a teat formed integral with the bottom of the box and surrounded by a knockout cut and threaded for purposes of connecting a chandelier thereto, whereby the box may be used in connection with chandeliers having threaded openings for connecting the chandelier to the box or with chandeliers having brackets, the knock-out portions surrounding the teat forming a passageway for the wires through the chandelier.

In testimony whereof, I have hereunto signed my name to this specification.

FREDERICK A. TEFFT.